US012715569B2

(12) United States Patent
Ulloa et al.

(10) Patent No.: US 12,715,569 B2
(45) Date of Patent: Aug. 25, 2026

(54) BAGGAGE ACCESS IN VEHICLE AND METHODS THEREOF

(71) Applicant: Supernal, LLC, Washington, DC (US)

(72) Inventors: Jorge Ulloa, Hawthorne, CA (US); Mark Bjornholm, Lake Forest, CA (US); Jesse Rivera, Long Beach, CA (US)

(73) Assignee: Supernal, LLC, Irvine, CA (US)

( * ) Notice: Subject to any disclaimer, the term of this patent is extended or adjusted under 35 U.S.C. 154(b) by 0 days.

(21) Appl. No.: 18/598,762

(22) Filed: Mar. 7, 2024

(65) Prior Publication Data

US 2024/0300635 A1 Sep. 12, 2024

Related U.S. Application Data

(60) Provisional application No. 63/488,914, filed on Mar. 7, 2023.

(51) Int. Cl.

| | |
|---|---|
| ***B64C 1/14*** | (2006.01) |
| ***B64C 27/24*** | (2006.01) |
| ***B64C 27/26*** | (2006.01) |
| ***B64D 9/00*** | (2006.01) |
| ***B64D 45/00*** | (2006.01) |

(52) U.S. Cl.
CPC ............ *B64C 1/1415* (2013.01); *B64C 27/24* (2013.01); *B64C 27/26* (2013.01); *B64D 9/00* (2013.01); *B64D 45/00* (2013.01)

(58) Field of Classification Search
CPC ....... B64C 1/1415; B64C 1/1461; B64C 1/20; B64D 9/00; B64D 27/31; B64D 27/33; B64D 27/34
See application file for complete search history.

(56) References Cited

U.S. PATENT DOCUMENTS

| | | | | |
|---|---|---|---|---|
| 9,944,333 | B1 * | 4/2018 | Stojkovic | B62D 33/0273 |
| 2008/0283673 | A1 * | 11/2008 | Yoeli | B64C 29/0033 244/23 A |
| 2019/0228375 | A1 * | 7/2019 | Laury | G05D 1/0088 |
| 2022/0289371 | A1 * | 9/2022 | Schroeder | B60L 50/60 |
| 2022/0379780 | A1 * | 12/2022 | Salter | B60N 2/065 |
| 2024/0017825 | A1 * | 1/2024 | Blake | B64U 10/13 |
| 2024/0140587 | A1 * | 5/2024 | Lewin | B64C 1/1415 |

FOREIGN PATENT DOCUMENTS

| | | | | |
|---|---|---|---|---|
| CN | 203016075 | * | 6/2013 | A45C 9/00 |
| CN | 106608216 B | * | 5/2021 | B60P 7/083 |
| CN | 215155062 U | * | 12/2021 | B62D 25/24 |

* cited by examiner

*Primary Examiner* — Timothy D Collins
*Assistant Examiner* — Terri L Filosi
(74) *Attorney, Agent, or Firm* — Bookoff McAndrews, PLLC

(57) ABSTRACT

An aircraft capable of carrying at least one passenger and at least one baggage item. The aircraft may include: a fuselage comprising a baggage compartment door, wherein the baggage compartment door comprises at least one securement mechanism configured to secure the at least one baggage item to an interior of the baggage compartment door; a wing mechanically coupled to the fuselage; and at least a first and a second primary variable speed rotors configured to provide lift for the fuselage, wherein each of the at least the first and the second primary variable speed rotors are driven by at least one electric motor that is driven by a power source. Other aspects are described and claimed.

20 Claims, 4 Drawing Sheets

100
135a
130
115
105
135b
105
135c 100
135a
130
115
105
135b
105
135c 100
105
115
105

BAGGAGE ACCESS IN VEHICLE AND METHODS THEREOF

CROSS REFERENCE TO RELATED APPLICATIONS

This application claims priority to U.S. Provisional Application No. 63/488,914, filed Mar. 7, 2023, which is incorporated by reference herein in its entirety.

TECHNICAL FIELD

Aspects of the present disclosure relate generally to techniques for securely storing baggage and other objects in vehicles, and, more specifically, to embodiments of baggage storage that allow the baggage to be securely stored in an unobtrusive manner during travel and thereafter enable easy and quick removal of the baggage upon arrival.

BACKGROUND

Vehicles, such as aircraft, are designed to carry both passengers and baggage (e.g., bags and suitcases, assistive devices such as wheelchairs, etc.). For instance, larger passenger airlines have ample room in the fuselage to comfortably seat a multitude of passengers and also have a variety of storage compartments where the baggage can be stored (e.g., overheard bins may be utilized to store smaller baggage and/or personal items, a dedicated baggage hold may be utilized to store larger baggage and other items, etc.). In contrast, smaller aircraft have greater limitations on the amount of baggage that can be stored and the locations where it can be stored at. These limitations may be burdensome and may lead to various baggage storage issues.

The present disclosure is accordingly directed to an improved baggage storage and retrieval system that enables unobtrusive storage of various passenger items and easy retrieval thereof. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, a vehicle with an improved baggage storage and retrieval system is disclosed.

In one aspect, an aircraft capable of carrying at least one passenger and at least one baggage item is provided, including: a fuselage comprising a baggage compartment door, wherein the baggage compartment door comprises at least one securement mechanism configured to secure the at least one baggage item to an interior of the baggage compartment door; a wing mechanically coupled to the fuselage; and at least a first and a second primary variable speed rotors configured to provide lift for the fuselage, wherein each of the at least the first and the second primary variable speed rotors are driven by at least one electric motor that is driven by a power source.

In another aspect, a method of securing an article of baggage is to a baggage compartment door of an aircraft is disclosed. The method may include: identifying, at a processor of a device, an availability of a securement mechanism configured to secure at least one baggage item to an interior of the baggage compartment door; receiving, from at least one sensor associated with the device, an indication that the article of baggage is secured by the securement mechanism; determining, using the processor, whether the article of baggage becomes unsecured from the securement mechanism during operation of the aircraft; and transmitting, responsive to determining that the article of baggage has become unsecured from the securement mechanism during operation of the aircraft, an alert notification to at least one predetermined device.

In yet another aspect, a door system for an aircraft is disclosed. The door system includes: a baggage compartment door coupled to an aircraft body of the aircraft via a hinge, the baggage compartment door having a first surface and a second surface; and at least one securement mechanism integrated with the baggage compartment door, wherein the at least one securement mechanism is configured to secure at least one object to the first surface; wherein the at least one object is contained within the aircraft body and the second surface is substantially flush with the aircraft body when the baggage compartment door is in a first operational state; wherein the baggage compartment door is configured to rotate about the hinge and extend away from the aircraft body in the second operational state.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate the disclosed embodiments, and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this disclosure. In the drawings.

DETAILED DESCRIPTION OF THE EMBODIMENTS

Figure 1:
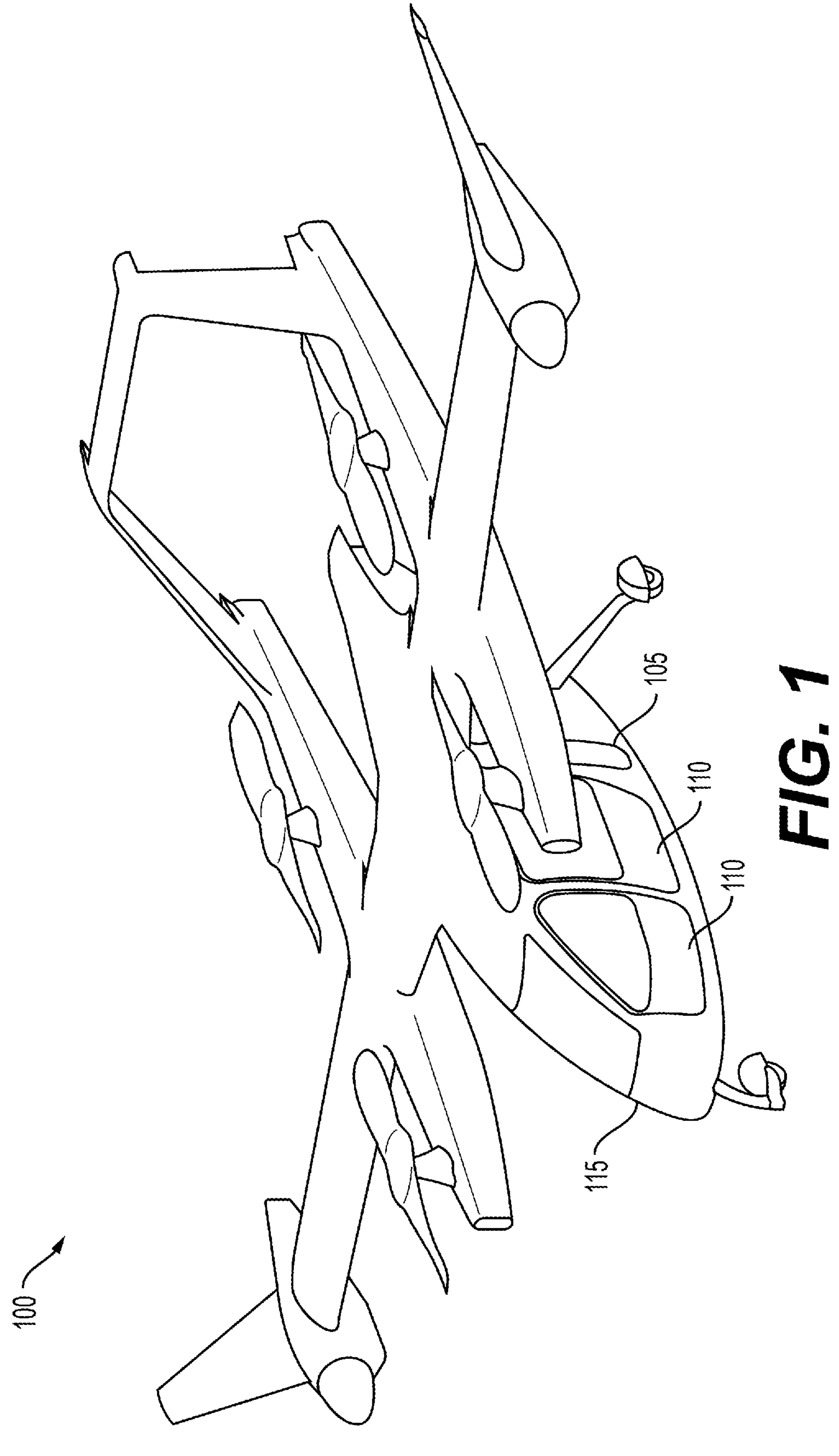
FIG. 1 depicts a perspective view of a vehicle having an exemplary baggage compartment in a closed state, according to various aspects of the present disclosure.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as "about," "approximately," "substantially," and "generally," are used to indicate a possible variation of ±10% of a stated or understood value. In addition, the term "between" used in describing ranges of values is intended to include the minimum and maximum values described herein. The use of the term "or" in the claims and specification is used to mean "and/or" unless explicitly indicated to refer to alternatives only or the alternatives are mutually exclusive, although the disclosure supports a definition that refers to only alternatives and "and/or." As used herein "another" may mean at least a second or more.

As used herein, the term "vehicle" may refer to any type of vehicle, e.g., motor vehicles (e.g., cars, trucks, buses, etc.), railed vehicles (e.g., trains, etc.), amphibious vehicles (e.g., boats, etc.), aircraft (e.g., planes, helicopters, etc.), spacecraft, autonomous or semi-autonomous vehicles, and the like. Various embodiments of the present disclosure relate generally to electric vehicles, such as vehicles driven via one or more electric loads, components associated with the electrical loads, and monitoring systems for the electrical loads and/or the components associated with the electrical loads. The electric loads may be in the form of electric motors associated with one or more propellers of a vertical takeoff and landing vehicle (VTOL).

A variety of smaller types of aircraft exist that may be utilized to quickly and conveniently ferry passengers and objects between locations. One such aircraft, for example, is an electric VTOL vehicle. Advances in battery and propulsion technology have led to the development of these VTOLs that may be able to carry a pilot and a few passengers relatively short distances (e.g., a couple hundred miles, etc.) at a variety of speeds. VTOLs offer real potential to impact air mobility (e.g., in an urban environment, etc.) by operating as airport shuttles, on-demand air taxis, air ambulances, and the like.

The secure storage of baggage in vehicles, particularly aircraft, presents challenges, especially in scenarios where space constraints are exacerbated by the limitations of smaller aircraft, such as VTOLs. Existing baggage storage solutions often fall short in addressing the dual requirements of secure storage during travel and easy accessibility upon arrival. More particularly, conventional attempts encounter difficulties in efficiently utilizing limited space, securing various types of baggage items, and providing a seamless experience for passengers and operators. Specifically, while larger aircraft may employ overheard bins and dedicated baggage holds, these solutions are not easily adaptable to smaller aircraft with restricted space. Although conventional VTOLs may contain storage compartments, loading and unloading baggage into and out of these compartments may require strenuous lifting, which may be difficult to do if the baggage is large and/or heavy and may prevent certain individuals from completing such an action safely. Additionally, some conventional VTOL designs may be equipped with a tailgate-style baggage compartment door that may enhance accessibility but lacks provisions for directly securing baggage items to the door, thereby requiring the baggage to be secured elsewhere in the already space-constrained fuselage.

Accordingly, a need exists for an improved baggage storage design of a vehicle that may enable unobtrusive storage of various passenger items and easy retrieval thereof. Additionally, there is a need for a baggage storage system that may effectively and securely store one or more assistive devices, such as wheelchairs, that are used by individuals with mobility disabilities.

In view of the issues described above, aspects of the disclosure address the shortcomings of conventional approaches by introducing a secure baggage storage system with a unique focus on the baggage compartment door. This system may leverage various types of securement mechanisms that are integrated directly into the baggage compartment door's interior surface, thereby allowing passengers to secure various baggage items during travel. More particularly, in some embodiments, the system may allow passengers to secure baggage directly to the compartment door, utilizing mechanisms such as tiedown straps or binding clips, ensuring a stable and unobtrusive storage solution. In other embodiments, various types of sensors may be integrated into the baggage compartment door that may be configured to provide real-time indications of baggage securement status, thereby enabling proactive detection of any unsecured baggage during vehicle operation. In further embodiments, various safety features may be leveraged to restrict certain vehicle functionalities until all baggage is properly secured, thereby addressing potential issues associated with unsecured baggage during flight.

Reference will now be made in detail to the exemplary embodiments of the present disclosure described below and illustrated in the accompanying drawings. Wherever possible, the same reference numbers will be used throughout the drawings to refer to same or like parts.

Additional objects and advantages of the embodiments will be set forth in part in the description that follows, and in part will be obvious from the description, or may be learned by practice of the embodiments. It is to be understood that both the foregoing general description and the following detailed description are exemplary and explanatory only and are not restrictive of the claims.

Referring now to FIG. 1, an exemplary vehicle is illustrated. Vehicle 100 is shown containing baggage compartment door 105 in a first configuration, e.g., a closed configuration. For simplicity purposes, the remaining disclosure described herein, and the figures associated therewith, are made with reference to an electric powered VTOL aircraft having mechanically coupled wings and at least two variable speed rotors that are configured to provide lift for the fuselage. However, such a designation is not limiting and the concepts described herein may be applicable to virtually any type of vehicle, e.g., motor vehicles (e.g., cars, trucks, buses, motorcycles, etc.), railed vehicles (e.g., trains, etc.), amphibious vehicles (e.g., boats, etc.), aircraft (e.g., planes, helicopters, etc.), spacecraft, autonomous or semi-autonomous vehicles, and the like.

Vehicle 100 may contain a first end (e.g., corresponding to the front of vehicle 100) and a second end (e.g., corresponding to a rear of vehicle 100). In an embodiment, baggage compartment door 105 may be positioned toward the second end of vehicle 100 and may be placed adjacent to passenger doors 110. When in the first configuration, the exterior of baggage compartment door 105 may be substantially flush with the external body of vehicle 100. In an embodiment, the body of vehicle 100 may be composed of a lightweight material, e.g., a carbon-fiber composite material, an aluminum or titanium alloy, fiberglass, steel, some combination of any of the foregoing, and the like. In an embodiment, baggage compartment door 105 may have the same or different composition as the rest of the vehicle body. As further described herein, an interior of baggage compartment door 105 may securely store at least one baggage item (e.g., a bag, a suitcase, a mobility assistance device, etc.) within a designated space in fuselage 115.

It is important to note that the apparent size and placement of baggage compartment door 105 in FIG. 1 is not limiting. More particularly, baggage compartment door 105 may be larger or smaller in width and/or height than passenger doors 110 and/or positioned at another location of the vehicle 100 (e.g., in front of the passenger doors 110, between the passenger doors 110, etc.). Additionally, the number of baggage compartment doors 105 in the vehicle 100 may not just be limited to one. For instance, another baggage compartment door may be present on vehicle 100 that is located on an opposite side of vehicle 100 from baggage compartment door 105, as further illustrated in FIGS. 2-3. Additionally or alternatively, although not illustrated in any figure, two or more baggage compartment doors may be present on one or both sides of vehicle 100. In this configuration, each of the multitude of baggage compartment doors may have the same or different dimensions as the other.

Figure 2:
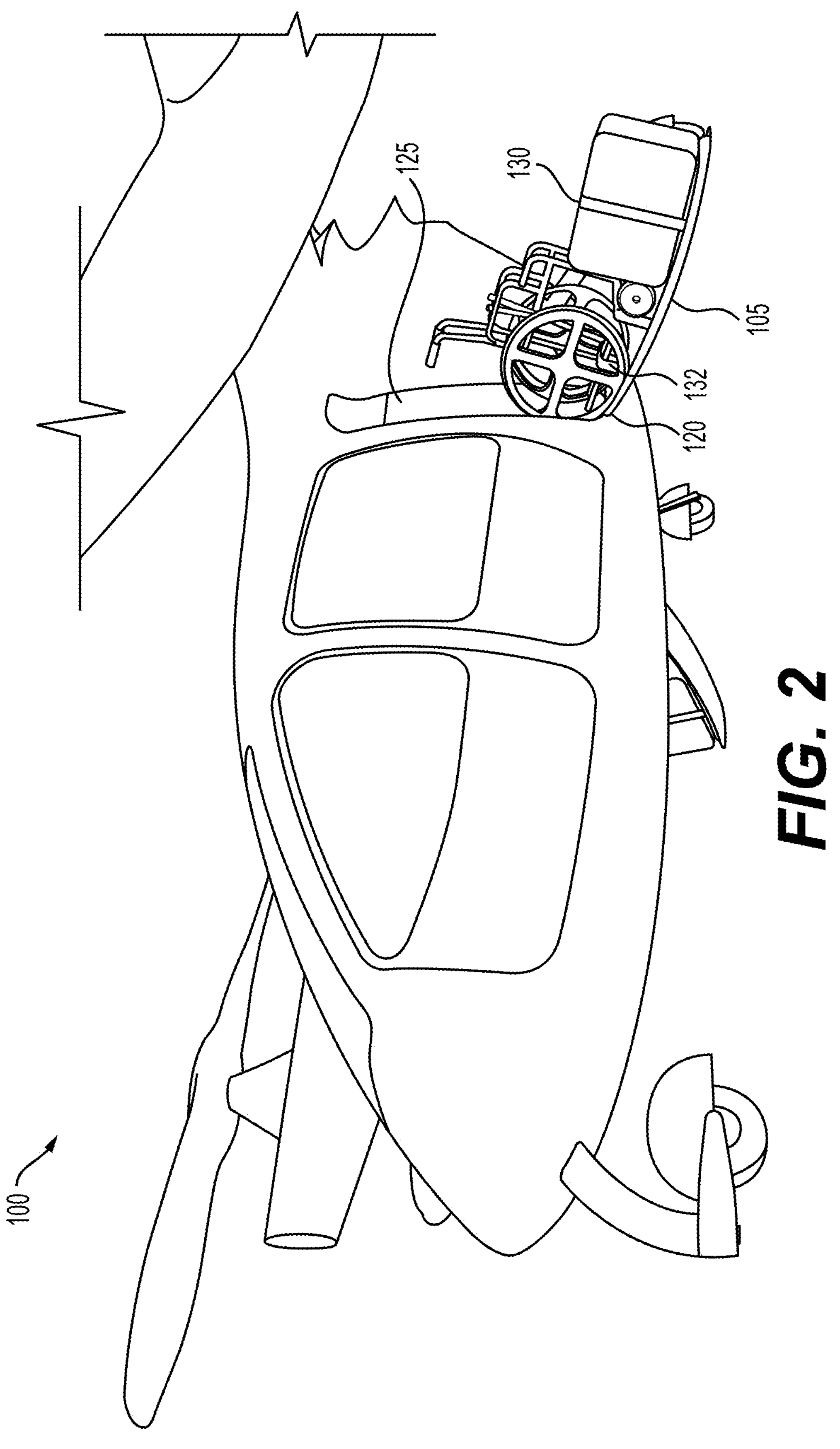
FIG. 2 depicts another perspective view a vehicle having an exemplary baggage compartment in an open state, according to various aspects of the present disclosure.

Referring now to FIG. 2, vehicle 100 is shown in an exemplary second configuration. More particularly, vehicle 100 is shown with baggage compartment door 105 in an open configuration. Baggage compartment door 105 may be transformed from the first configuration (e.g., the closed configuration) to the second configuration (e.g., the open configuration) via mechanical means (e.g. by pulling or pushing of a knob or handle attached to or integrated with baggage compartment door 105, etc.), electronic means (e.g., actuation of a button that transmits a signal to a controller that facilitates the opening of baggage compartment door 105, etc.), a combination thereof, and the like. In an embodiment, baggage compartment door 105 may be designed to open and close in a variety of different ways. For instance, baggage compartment door 105 in FIG. 2 is illustrated as having hinge line 120 at a bottom section of baggage compartment door 105 that enables it to open (e.g., by rotating about hinge line 120) downwards and outwards. However, in other embodiments, hinge line 120 may be located on the left, right, or top section of the door, enabling baggage compartment door 105 to be opened in different ways and in different directions. In another example, baggage compartment door 105 may be a telescoping door (not illustrated) that may extend out from the vehicle fuselage. In yet another example, baggage compartment door 105 may be a type of double door (not illustrated) that contains two separate components (e.g., an upper and lower component, a leftward and rightward component, etc.), each of which may open outward in unison with or independently from the other. Other types of baggage compartment doors, and opening configurations associated therewith, not explicitly listed or illustrated herein may also be utilized.

In an embodiment, when in the open configuration, baggage compartment door 105 may be inclined with respect to fuselage 115 and may thereby act as a ramp, enabling easy walking access up to baggage storage compartment area 125 within the fuselage 115. In an embodiment, baggage storage compartment area 125 may be a dedicated baggage space that is separate from fuselage 115. Alternatively, in another embodiment, baggage storage compartment 125 may constitute a portion of fuselage 115 and may be accessible to passengers during flight. In an embodiment, all or a portion of baggage compartment door 105 may be substantially hollow. In such an embodiment, baggage compartment door 105 may have an access panel (not illustrated) positioned on a portion of an interior surface of baggage compartment door 105 that a user may open via conventional means to store small items within the door itself, thereby further maximizing storage space of vehicle 100.

In an embodiment, an interior surface of baggage compartment door 105 (i.e., the surface of baggage compartment door 105 that is oriented toward an interior of fuselage 115 when the baggage compartment door 105 is in the closed configuration) may contain one or more securement mechanisms that are utilized to secure the baggage to the interior surface of baggage compartment door 105 and keep it fixed in place during travel. In an embodiment, the securement mechanisms may be integrated into baggage compartment door 105. Alternatively, in another embodiment, the securement mechanisms may be objects that can be attached and detached to a portion of baggage compartment door 105 (e.g., to a track that is positioned along a length of the interior surface of baggage compartment door 105, to dedicated sections of the interior surface of baggage compartment door, etc.).

In an embodiment, the securement mechanisms may take many different forms. For example, in one embodiment, the securement mechanisms may take the form of straps 130 that may be wrapped around all, or portions of, baggage to secure them against the inside of baggage compartment door 105. For instance, with reference to FIG. 2, one set of straps 130 may be wrapped around a suitcase and another set of tie down straps may be wrapped around wheels of a folded wheelchair. In some aspects, straps 130 may be adjustable in length and may be configured to recede into a space within baggage compartment door 105 when not in use (e.g., via a hole on the interior surface of baggage compartment door 105). When needed, a user may grab hold of a portion of strap 130 that is designed to remain above the interior surface of baggage compartment door 105 (e.g., a user may grab a clasp or buckle that has dimensions greater than the aforementioned hole on the interior surface), pull strap 130 to the needed length (i.e., to a length that may allow the user to properly wrap the strap around a particular baggage item), and thereafter insert the top portion into a corresponding buckle (e.g., also positioned on interior surface of baggage compartment door 105), thereby securing the baggage item to baggage compartment door 105.

In another embodiment, the securement mechanisms may take the form of binding clips 132 that are configured to secure, via tension, a portion of a baggage item against baggage compartment door 105. For example, the wheels of a wheelchair may slide into a set of binding clips 132, which may tightly grasp the wheel and prevent the wheelchair from moving during travel. In situations where a clip, or set of clips, cannot properly secure a baggage item, a securement aid may be attached to the baggage item to facilitate the securement process. For example, a set of clips may not be able to easily secure a suitcase. In such a scenario, a securement aid (not illustrated), such as a rod, may be temporarily attached to the suitcase and may be the object that directly interacts with the binding clips.

Other types of securement mechanisms, not explicitly mentioned above, may also exist. In an embodiment, only a single type of securement mechanism may be utilized in any given baggage compartment door. Conversely, in another embodiment, one or more baggage compartment doors 105 of vehicle 100 may be equipped with two or more different types of securement mechanisms. For example, baggage compartment door 105 may be equipped with both binding clips and straps (e.g., tie down straps, adjustable straps, etc.), whereby the straps may most effectively secure a baggage item such as a suitcase and where the binding clips may most effectively secure an assistive mobility device, such as a folded wheelchair.

In an embodiment, baggage compartment door 105 may contain one or more different types of sensors (not illustrated) that may aid in one or more of: baggage loading, baggage securement, and/or baggage removal. For instance, in an embodiment, light sensors may exist that are positioned proximate to each securement mechanism location. These sensors may not only provide an indication of where the securement mechanisms are located on baggage compartment door 105 (e.g., for easy identification in low-lighting environments) but they may also provide the user with a quick indication of whether or not a baggage item has been effectively secured. For instance, given an exemplary baggage compartment door 105 to which no objects are attached, each of the sensors may emit a green light. However, upon detection that one of the securement mechanisms is securing a baggage item (e.g., by receipt of a signal from another sensor, etc.), the light sensor associated with the relevant securement mechanism may emit a red light.

In an embodiment, baggage compartment door 105 may contain one or more motions sensors that may be able to monitor the secured baggage during flight and make a determination of whether it has become unattached from the door and moved. In an embodiment, these motion sensors may be integrated within the securement mechanism or, alternatively, may be positioned proximate to the securement mechanism location. In situations in which the motion sensors detect object movement, especially during flight, an alert notification may be transmitted (e.g., via wired or wireless means, etc.) to a designated device (e.g., a user's device, a designated vehicle device, etc.). The alert notification may, for instance, provide an indication that at least one baggage item has become unsecured from its door position. Additionally or alternatively, the alert notification may provide an indication of which baggage item has moved. Other sensors (e.g., a pressure sensor, a camera sensor, etc.) may also be able to detect when baggage becomes unsecured during travel.

Figures 3A, 3B, 3C:
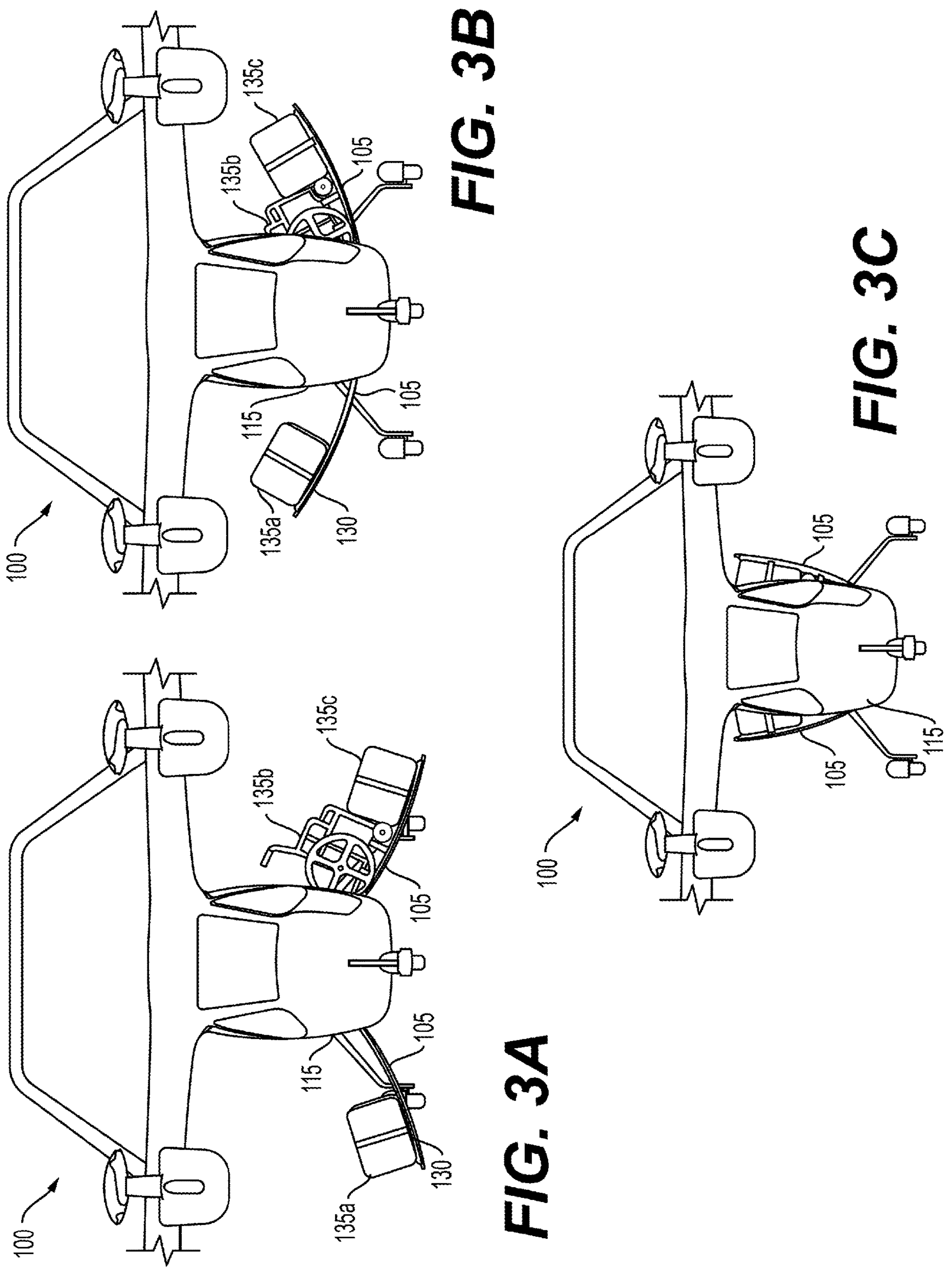
FIGS. 3A-3C depict an exemplary process of transitioning an exemplary baggage compartment of a vehicle from an open state to a closed state, according to various aspects of the present disclosure.

Referring now to FIGS. 3A-3C, an exemplary process of transitioning baggage compartment door 105 of vehicle 100 from an open configuration to a closed configuration is provided. Starting with FIG. 3A, a vehicle is illustrated that has two baggage compartment doors 105 (i.e., one on each side of vehicle 100), each of which secures at least one baggage item *135a*-*135c* via securement mechanisms 130. Prior to vehicle flight, and upon secure attachment of baggage items *135a*-*135c*, baggage compartment doors 105 may be caused to fold up and into fuselage 115 of vehicle 100, as illustrated in FIG. 3B. In an embodiment, each of baggage compartment doors 105 may fold simultaneously in unison. Alternatively, in another embodiment, each of the baggage compartment doors 105 may be independently operable (i.e., one of the doors may be folded closed whereas the other door may remain in the open configuration). As the doors approach closing, as illustrated in FIG. 3C, baggage items *135a*-*135c* may enter into baggage storage compartment area 125 of vehicle 100, where they may reside throughout the trip.

Figure 4:
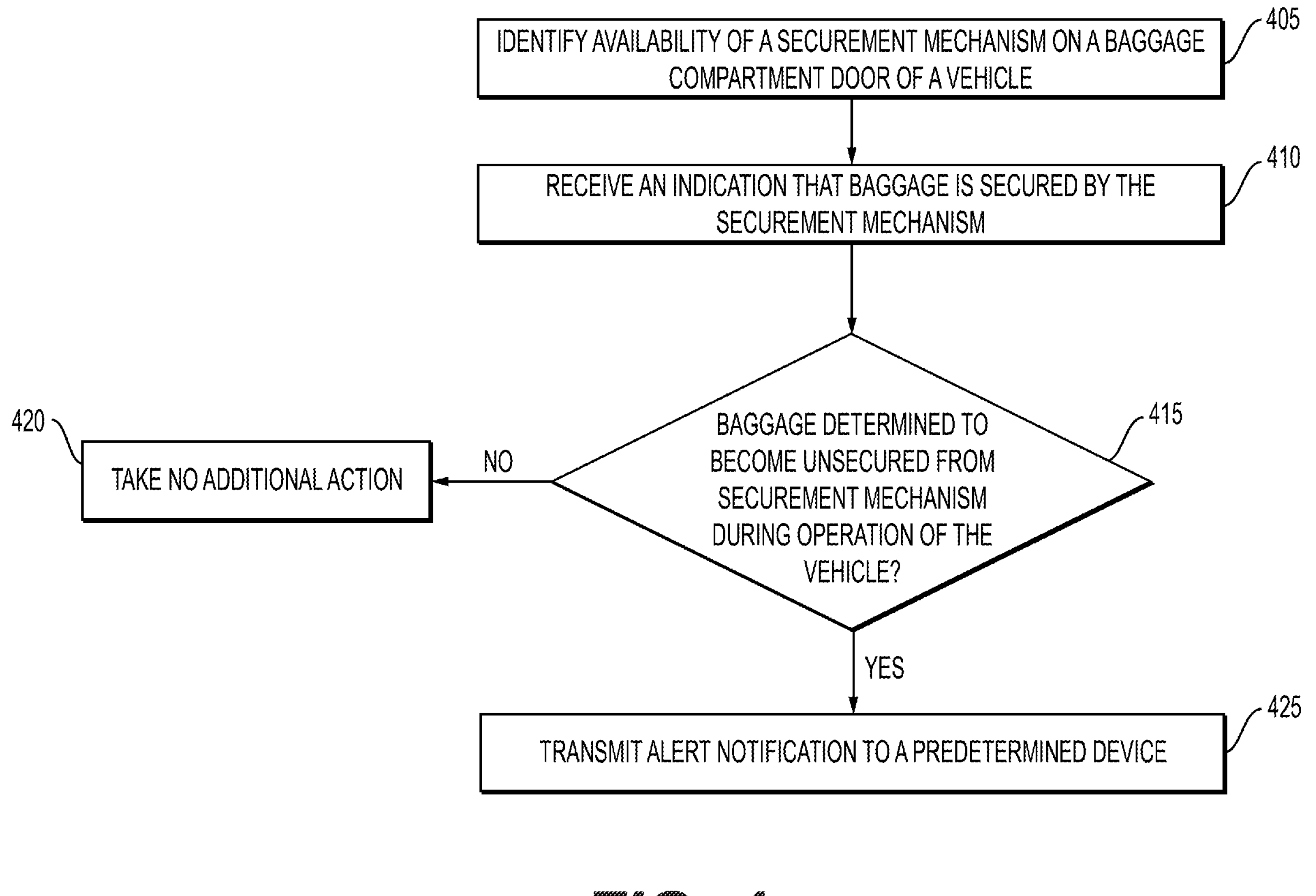
FIG. 4 depicts an exemplary flowchart of a method of ensuring an article of baggage is secured to a baggage compartment door, according to various aspects of the present disclosure.

Referring now to FIG. 4, an exemplary process flow 400 is depicted for ensuring that an article of baggage remains secured to a baggage compartment of a vehicle, such as an electric VTOL aircraft.

At step 405, a computing device may identify which securement mechanisms associated with a baggage compartment door are available for use. In this regard, the computing device (e.g., a computer integrated into the vehicle, etc.) may receive a signal (e.g., continuously, at predetermined intervals, etc.) from one or more sensors positioned at, or proximate to, a designated baggage placement area of the baggage compartment door (i.e., the area of the interior surface of the baggage compartment door where baggage is designated to be placed and secured by the securement mechanism). These signals may provide an indication of which of the securement mechanisms, if multiple exist, are currently securing baggage or are available for use. For example, if the securement mechanism is an adjustable strap, a buckle sensor may indicate whether the strap has been secured to the buckle and communicate this information the computing device.

In an embodiment, the computing device may transmit an instruction to one or more light sensors positioned at, or proximate to, each designated baggage placement area to emit a light, the color of which may be representative of the identified securement mechanism availability. These lights may provide helpful indications to users about where the securement mechanisms are located and which of them are available to use. For instance, in a situation where a securement mechanism is in-use, an instruction may be transmitted to the corresponding light sensor(s) to emit a red light, thereby implying unavailability. Conversely, if a securement mechanism is not in-use, then an instruction may be transmitted to the corresponding light sensor(s) to emit a green light, indicating availability.

At step 410, the computing device may receive an indication that baggage is present in the designated baggage placement area and/or that the baggage is secured by the one or more securement mechanisms. In this regard, the computing device may leverage received sensor information to make this determination. In an embodiment, the sensors may be, for example, one or more pressure sensors, camera sensors, a combination thereof, and the like. As a non-limiting example of the foregoing, a pressure sensor located in a designated baggage placement area may detect a pressure change when an article of baggage (e.g., a suitcase, a duffel bag, etc.) is placed and secured onto the designated baggage placement area over the pressure sensor. Upon detecting that the pressure change is greater than a predetermined threshold (e.g., where the predetermined threshold is representative of the presence of an article of baggage), the pressure sensor may transmit a signal to the computing device indicating that an article of baggage is present in the designated baggage placement area. In another non-limiting example, a camera sensor may be positioned on the baggage compartment door, or on another area of the vehicle, and may be focused on the designated baggage placement area. The computing device may receive an image feed of the designated baggage placement area from the camera sensor and upon detection that the baggage has moved outside of the designated baggage placement area (e.g., by leveraging one or more real-time image analysis techniques known in the art, etc.), the computing device may conclude that baggage has become unsecured.

At step 415, an embodiment may determine whether the secured baggage becomes unsecured during vehicle operation. More particularly, an embodiment may identify whether a securement mechanism has come undone and/or whether baggage has moved at least partially away from a designated baggage placement area during vehicle operation. In the context of this application, vehicle operation may refer to vehicle initiation (i.e., that activation of vehicle systems), vehicle movement (e.g., vehicle flight, rotor operation, etc.), etc. In this regard, the computing device may receive sensor indications of one or both of the foregoing. For instance, the computing device may receive an indication from a buckle sensor that a securement strap has become unbuckled from the buckle. In another example, a pressure sensor may identify that a pressure change has been detected that implies baggage movement (e.g., the pressure sensor may identify that the pressure has dropped below the predetermined threshold, etc.). In yet another example, the computing device may determine (e.g., via analysis of an image feed provided by a camera sensor, etc.) that a baggage item has moved outside of the designated baggage area.

Responsive to determining, at step 415, that no baggage has become unsecured during vehicle operation, an embodiment may, at step 420, take no additional action. Conversely, responsive to determining, at step 415, that baggage has become unsecured during vehicle operation, an embodiment may, at step 425, transmit an alert notification to a predetermined device. In an embodiment, the predetermined device may be one or more of a vehicle operator's device (e.g., a pilot's phone, etc.), a passenger's device, an integrated vehicle device (e.g., a communication device built into the vehicle, etc.), and the like. In an embodiment, the alert notification may be an audio and/or visual notification and may provide an indication that an article of baggage has become unsecured from the baggage compartment door. In an embodiment, the alert notification may provide a further indication of which securement mechanism(s) the unsecured baggage item is associated with.

In an embodiment, the computing device may limit the functionality of certain aspects of the vehicle upon detection that baggage has become unsecured. For example, in a situation where aircraft systems have been initiated but the aircraft is not yet in flight, the computing device may prevent the baggage compartment door from closing, if the baggage compartment door is open, or may prevent the vehicle from taking flight until all baggage is properly secured. In another example, if baggage has become unsecured during flight, then the baggage compartment door associated with the unsecured baggage item may remain shut until a confirmation is detected at the computing device indicating that a vehicle operator has seen the alert notification and has provided acknowledgement input indicating that they are aware of the unsecured baggage item.

The many features and advantages of the present disclosure are apparent from the detailed specification, and thus, it is intended by the appended claims to cover all such features and advantages of the present disclosure that fall within the true spirit and scope of the disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

What is claimed is:

1. An aircraft capable of carrying at least one passenger and at least two baggage items, comprising:

a fuselage comprising a baggage compartment door, wherein the baggage compartment door has an interior surface and comprises at least two securement mechanisms each mounted to the interior surface, wherein each of the at least two securement mechanisms is configured to attach and retain one of the at least two baggage items against the interior surface when the baggage compartment door is in a closed configuration;

wherein a first securement mechanism of the at least two securement mechanisms is of a different type than a second securement mechanism of the at least two securement mechanisms;

a wing mechanically coupled to the fuselage; and at least a first and a second primary variable speed rotors configured to provide lift for the fuselage, wherein each of the at least the first and the second primary variable speed rotors are driven by at least one electric motor that is driven by a power source.

2. The aircraft of claim 1, wherein the first securement mechanism of the at least two securement mechanisms is a tie down strap.

3. The aircraft of claim 1, wherein the first securement mechanism of the at least two securement mechanisms is a binding clip.

4. The aircraft of claim 1, wherein the baggage compartment door comprises at least two baggage compartment doors.

5. The aircraft of claim 4, wherein each of the at least two baggage compartment doors is independently operable.

6. The aircraft of claim 1, wherein the at least two baggage items are at least two of: a suitcase, a bag, and an assistive mobility device.

7. The aircraft of claim 1, wherein the baggage compartment door is configured to rotate about a hinge line.

8. The aircraft of claim 1, wherein the baggage compartment door, in an open configuration, is angled at an incline to the fuselage.

9. The aircraft of claim 1, wherein the baggage compartment door is composed of a lightweight composite material.

10. The aircraft of claim 9, wherein the lightweight composite material is selected from the group consisting of: a carbon-fiber composite, an aluminum alloy, and a titanium alloy.

11. The aircraft of claim 1, wherein the aircraft is a vertical takeoff and landing (VTOL) vehicle.

12. The aircraft of claim 1, wherein the baggage compartment door is positioned adjacent to one or more passenger doors on the aircraft.

13. The aircraft of claim 1, wherein the baggage compartment door comprises two baggage compartment doors.

14. An aircraft comprising a door system, wherein the door system comprises:

a baggage compartment door configured to be coupled to an aircraft body of the aircraft via a hinge, the baggage compartment door having a first surface and a second surface; and at least two securement mechanisms integrated with the baggage compartment door, wherein each of the at least two securement mechanisms are mounted to the first surface and are each configured to attach and retain one of at least two objects against the first surface when the baggage compartment door is in a first operational state and wherein a first securement mechanism of the at least two securement mechanisms is of a different type than a second securement mechanism of the at least two securement mechanisms;

wherein the second surface is substantially flush with the aircraft body when the baggage compartment door is in the first operational state;

wherein the baggage compartment door is configured to rotate about the hinge and extend away from the aircraft body in a second operational state;

wherein the first operational state of the baggage compartment door corresponds to a closed configuration and wherein the second operational state of the baggage compartment door corresponds to an open configuration.

15. The door system of claim 14, wherein the first securement mechanism of the at least two securement mechanisms is an adjustable strap, wherein a portion of the adjustable strap is contained in a space within the baggage compartment door.

16. The door system of claim 14, wherein the first surface of the baggage compartment door includes one or more designated baggage placement areas.

17. The door system of claim 14, wherein the second securement mechanism of the at least two securement mechanisms is a binding clip configured to receive and retain a wheel of an assistive mobility device.

18. The door system of claim 14, wherein the baggage compartment door, in the second operational state, is configured to function as a ramp.

19. The aircraft of claim 14, wherein the aircraft is a vertical takeoff and landing (VTOL) vehicle.

20. The aircraft of claim 14, wherein the baggage compartment door comprises two baggage compartment doors.

* * * * *